US012224477B2

(12) United States Patent
Kim et al.

(10) Patent No.: US 12,224,477 B2
(45) Date of Patent: Feb. 11, 2025

(54) MULTIPLE-INPUT MULTIPLE-OUTPUT ANTENNA APPARATUS AND HEAT DISSIPATION DEVICE THEREFOR

(71) Applicant: KMW INC., Hwaseong-si (KR)

(72) Inventors: Duk Yong Kim, Yongin-si (KR); Kyo Sung Ji, Hwaseong-si (KR); Chi Back Ryu, Hwaseong-si (KR); Kyu Chul Choi, Hwaseong-si (KR); Hye Yeon Kim, Hwaseong-si (KR); In Hwa Choi, Yongin-si (KR); Jae Ho Jang, Pohang-si (KR); Jae Hyun Park, Hwaseong-si (KR); Youn Jun Cho, Hwaseong-si (KR); Jeong Hyun Choi, Hwaseong-si (KR)

(73) Assignee: KMW INC., Hwaseong-si (KR)

( * ) Notice: Subject to any disclaimer, the term of this patent is extended or adjusted under 35 U.S.C. 154(b) by 108 days.

(21) Appl. No.: 18/075,408

(22) Filed: Dec. 5, 2022

(65) Prior Publication Data

US 2023/0099375 A1    Mar. 30, 2023

Related U.S. Application Data

(63) Continuation of application No. PCT/KR2021/006789, filed on Jun. 1, 2021.

(30) Foreign Application Priority Data

Jun. 8, 2020   (KR) ........................ 10-2020-0069237

(51) Int. Cl.
*H01Q 1/02*     (2006.01)
*H01Q 1/24*     (2006.01)
*H04B 7/0413*   (2017.01)

(52) U.S. Cl.
CPC ............... *H01Q 1/02* (2013.01); *H01Q 1/246* (2013.01); *H04B 7/0413* (2013.01)

(58) Field of Classification Search
CPC ............ H01Q 1/02; H01Q 1/036; H01Q 1/42; H01Q 1/246; H05K 7/20145; H05K 7/20154; H05K 7/20163
See application file for complete search history.

(56) References Cited

U.S. PATENT DOCUMENTS 7,898,810 B2 *  3/2011  Mason ............... H05K 7/20163
                                                    361/717
9,293,802 B2 *  3/2016  Voss .......................... H01Q 1/28
(Continued)

FOREIGN PATENT DOCUMENTS

JP   H08-031997 A    2/1996
JP   2004-246403 A   9/2004
(Continued)

OTHER PUBLICATIONS

Non-final Office Action mailed on Feb. 20, 2024 from the Japanese Patent Office for Japanese Application No. 2022-574117 and its English translation.
(Continued)

*Primary Examiner* — Tung X Le
(74) *Attorney, Agent, or Firm* — Insight Law Group, PLLC; Seung Lee

(57) ABSTRACT

A massive multiple-input multiple-output (MIMO) antenna apparatus and a heat dissipation device therefor are disclosed. The present disclosure according to at least one embodiment provides a massive MIMO antenna apparatus including a board, a first blowing unit, and a second blowing unit.
The board has at least one board surface that holds a distributed arrangement of a plurality of heat-generating components, has a width and a length longer than the width, (Continued)

and includes a first section having a first amount of heat generation and a second section having a second amount of heat generation greater than the first amount of heat generation, the first section and the second section being partitioned along a length direction of the board.

20 Claims, 20 Drawing Sheets

(56) References Cited

U.S. PATENT DOCUMENTS

| | | | |
|---|---|---|---|
| 9,901,007 B1* | 2/2018 | Reynov | H05K 7/20309 |
| 2006/0204271 A1 | 9/2006 | Tai et al. | |
| 2009/0311054 A1* | 12/2009 | Hoganson | B65G 51/08 |
| | | | 406/14 |
| 2011/0103015 A1 | 5/2011 | Hirano et al. | |
| 2011/0116230 A1* | 5/2011 | Kwak | H01Q 1/42 |
| | | | 361/688 |
| 2011/0122033 A1* | 5/2011 | Sauer | H01Q 1/286 |
| | | | 343/705 |
| 2016/0057888 A1 | 2/2016 | Hong et al. | |
| 2018/0220550 A1* | 8/2018 | Sieber | F04D 27/001 |
| 2018/0358710 A1* | 12/2018 | Toyao | H01Q 15/148 |
| 2020/0021005 A1* | 1/2020 | Kosaka | H01Q 1/42 |

FOREIGN PATENT DOCUMENTS

| | | |
|---|---|---|
| JP | 2006-303486 A | 11/2006 |
| JP | 2009-098950 A | 5/2009 |
| JP | 2019-536362 A | 12/2019 |
| KR | 10-2010-0020855 A | 2/2010 |
| KR | 10-2089548 B1 | 3/2020 |

OTHER PUBLICATIONS

International Search Report mailed Aug. 3, 2021 for International Application No. PCT/KR2021/006789 and its English translation.

* cited by examiner

MULTIPLE-INPUT MULTIPLE-OUTPUT ANTENNA APPARATUS AND HEAT DISSIPATION DEVICE THEREFOR

CROSS-REFERENCE TO RELATED APPLICATIONS

This application is a continuation application of International Application No. PCT/KR2021/006789, filed Jun. 1, 2021, which claims the benefit of Korean Patent Application No. 10-2020-0069237, filed Jun. 8, 2020, in the Korean Intellectual Property Office, the disclosures of which are incorporated herein in their entirety by reference.

TECHNICAL FIELD

The present disclosure in some embodiments relates to a massive multiple-input multiple-output antenna apparatus and a heat dissipation device therefor.

BACKGROUND

The statements in this section merely provide background information related to the present disclosure and do not necessarily constitute prior art.

A wireless communication technology, for example, multiple-input multiple-output (MIMO) technology is a spatial multiplexing technique that dramatically enhances data transmission capacity by using a plurality of antennas, in which a transmitter transmits different data via the respective transmitting antennas and a receiver detects different transmitted data through appropriate signal processing.

Therefore, the greater the number of transmit antennas and receive antennas, the greater channel capacity is obtained for allowing more data to be transmitted. For example, a ten-fold increase of antennas secures about 10 times the channel capacity of a current single-antenna system when using the same frequency band.

The 4G LTE-advanced technology uses up to 8 antennas. The current pre-5G phase sees the development of products with 64 or 128 antennas with the 5G phase coming up to expectedly use a much larger number of antennas, which is called massive MIMO technology. While the current cell operation is 2-dimensional, the incoming massive MIMO technology will be available with 3D-beamforming, which could then be called a full dimension- or FD-MIMO.

The massive MIMO technology takes more antennas accompanied by increased numbers of transmitters and filters. Still, lease costs of an installation space or space constraints render the making of smaller, lighter, and cheaper RF components such as antenna/filter/power amplifier/transceiver, etc. to be critical in the success or failure of an antenna device employing the massive MIMO technology. The same high power required to expand the coverage of massive MIMO causes high power consumption and heat generation to counteract the efforts to reduce the antenna weight and size.

Meanwhile, when using a massive MIMO antenna apparatus, beamforming is performed by adjusting the phase or amplitude of signals transmitted and received by a plurality of transmit/receive (TX/RX) components. Since the phase and amplitude of the signals transmitted and received by the TX/RX components are dependent on temperature, performing the beamforming needs to be preceded by a process of calibrating the temperature-dependent phase and amplitude variation of the signals transmitted and received by the respective TX/RX components.

Therefore, the more the relative temperature difference between the TX/RX components, the greater the calculation amount in the component, e.g. field programmable gate array (FPGA) performing calibration. In this case, a large amount of heat is released from the FPGA, adding to the already increasing heat generation over the entire antenna apparatus.

Meanwhile, to remove heat generated from communication components, a conventional antenna apparatus uses a convection cooling method using heat-radiating fins and fans. For example, in the conventional convection cooling method, heat-radiating fins extend in a vertical direction, and fans are disposed above or below the radiating fins to cool the same. However, such a conventional convection cooling method inevitably increases the distance in which the air discharged from the fans flows between the cooling fins, thereby degrading the cooling efficiency.

For example, assuming that a fan is disposed under the radiating fin, the air discharged from the fan cools the lower section of the radiating fin and then cools the upper section of the radiating fin. At this time, some of the flowing air may leak out, and accordingly, the amount of air delivered to the upper section of the radiating fin may be smaller than that of the lower section of the radiating fin. Additionally, since the air delivered to the upper section of the radiating fin has been preheated by the other section of the radiating fin, it may already be in a high-temperature state. Therefore, the conventional convection cooling method suffers from not only the lowered overall cooling efficiency but also significant variations in cooling efficiency over different sections of the radiating fin.

As described above, the massive MIMO antenna apparatus needs to be operated at high output to expand coverage, which incurs more power consumption and heat generation. Additionally, for the massive MIMO antenna apparatus to properly implement beamforming, a relative temperature difference needs to be reduced between the respective antenna components or TX/RX components. In this respect, the conventional convection cooling method cannot be appropriate, which has low cooling efficiency and a large variation in cooling efficiency over different sections. Therefore, the massive MIMO antenna apparatuses require a new type of cooling method capable of increasing cooling efficiency and reducing a relative temperature difference over different sections of the antenna apparatuses.

DISCLOSURE

Technical Problem

The present disclosure in some embodiments seeks to provide a massive multiple-input multiple-output (MIMO) antenna apparatus with a cooling method capable of reducing the relative temperature difference over different sections of the antenna apparatus while increasing the cooling efficiency.

SUMMARY

At least one embodiment of the present disclosure provides a massive multiple-input multiple-output (MIMO) antenna apparatus including a board, a first blowing unit, and a second blowing unit. The board has at least one board surface that holds a distributed arrangement of a plurality of heat-generating components, has a width and a length longer than the width, and includes a first section having a first amount of heat generation and a second section having a second amount of heat generation greater than the first amount of heat generation, the first section and the second section being partitioned along a length direction of the board. The first blowing unit is disposed to overlap at least some of the first section and configured to cool at least some of the heat generated from the first section, the first blowing unit comprising at least one or more first fans. The second blowing unit is disposed to overlap at least some of the second section and configured to cool at least some of the heat generated from the second section, the second blowing unit comprising at least one or more second fans. Here, the second blowing unit is configured to discharge an airflow greater than the airflow that the first blowing unit is configured to discharge.

Advantageous Effects

As described above, according to some embodiments of the present disclosure, the massive MIMO antenna apparatus can effectively remove heat generated from heat-generating components and minimize the relative temperature difference for each heat-generating component, thereby improving the function of the antenna apparatus.

Figure 1:
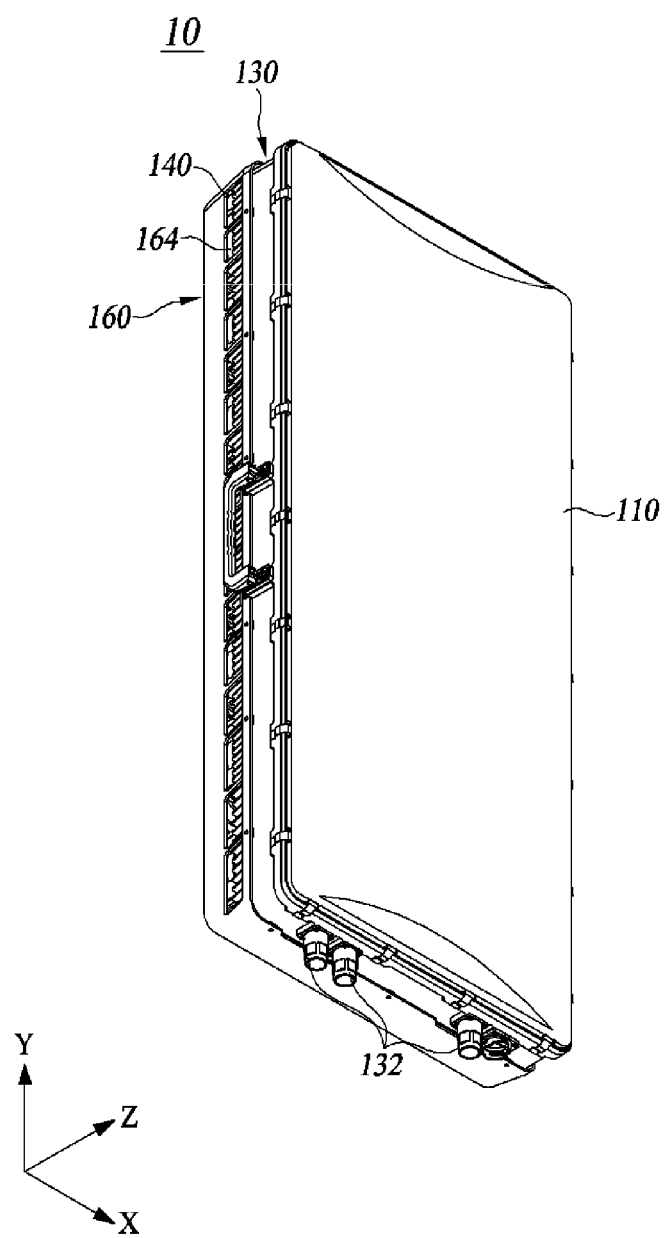
FIG. 1 is a perspective view of a massive MIMO antenna apparatus according to at least one embodiment of the present disclosure.

| REFERENCE NUMERALS | |
|---|---|
| 10: massive MIMO antenna apparatus | |
| 110: radome panel | 120: board |
| 122: heat-generating component | 130: housing |
| 140: cooling fins | 142: first cooling fin |
| 144: second cooling fin | 146: partition wall |
| 150: blowing unit | 152: first blowing unit |
| 154: second blowing unit | 160: back cover |
| 162: inlet opening | 164: discharge opening |
| 166: grille | 170: fan circuit board |
| 180: control unit | 710: temperature sensor |
| 720: noise sensor | 730: fan log storage unit |
| 1522: first fan | 1542: second fan |
| A1: first section | A2: second section |

DETAILED DESCRIPTION

Hereinafter, some embodiments of the present disclosure will be described in detail with reference to the accompanying illustrative drawings. In the following description, like reference numerals preferably designate like elements, although the elements are shown in different drawings. Further, in the following description of some embodiments, a detailed description of related known components and functions when considered to obscure the subject of the present disclosure will be omitted for the purpose of clarity and for brevity.

Additionally, various ordinal numbers or alpha codes such as first, second, i), ii), a), b), etc., are prefixed solely to differentiate one component from the other but not to imply or suggest the substances, order, or sequence of the components. Throughout this specification, when a part "includes" or "comprises" a component, the part is meant to further include other components, not to exclude thereof unless specifically stated to the contrary.

FIG. 1 is a perspective view of a massive multiple-input multiple-output (MIMO) antenna apparatus 10 according to at least one embodiment of the present disclosure.

Figure 2:
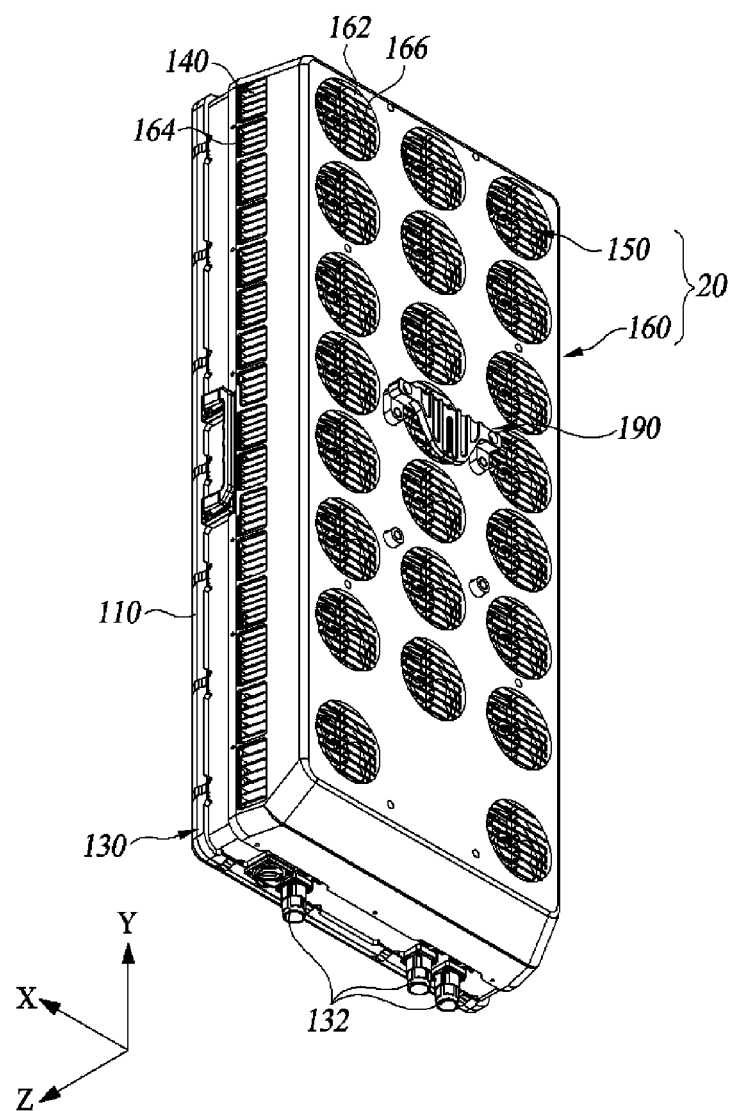
FIG. 2 is a rear perspective view of the massive MIMO antenna apparatus according to at least one embodiment of the present disclosure.

FIG. 2 is a rear perspective view of the massive MIMO antenna apparatus 10 according to at least one embodiment of the present disclosure.

Figure 3:
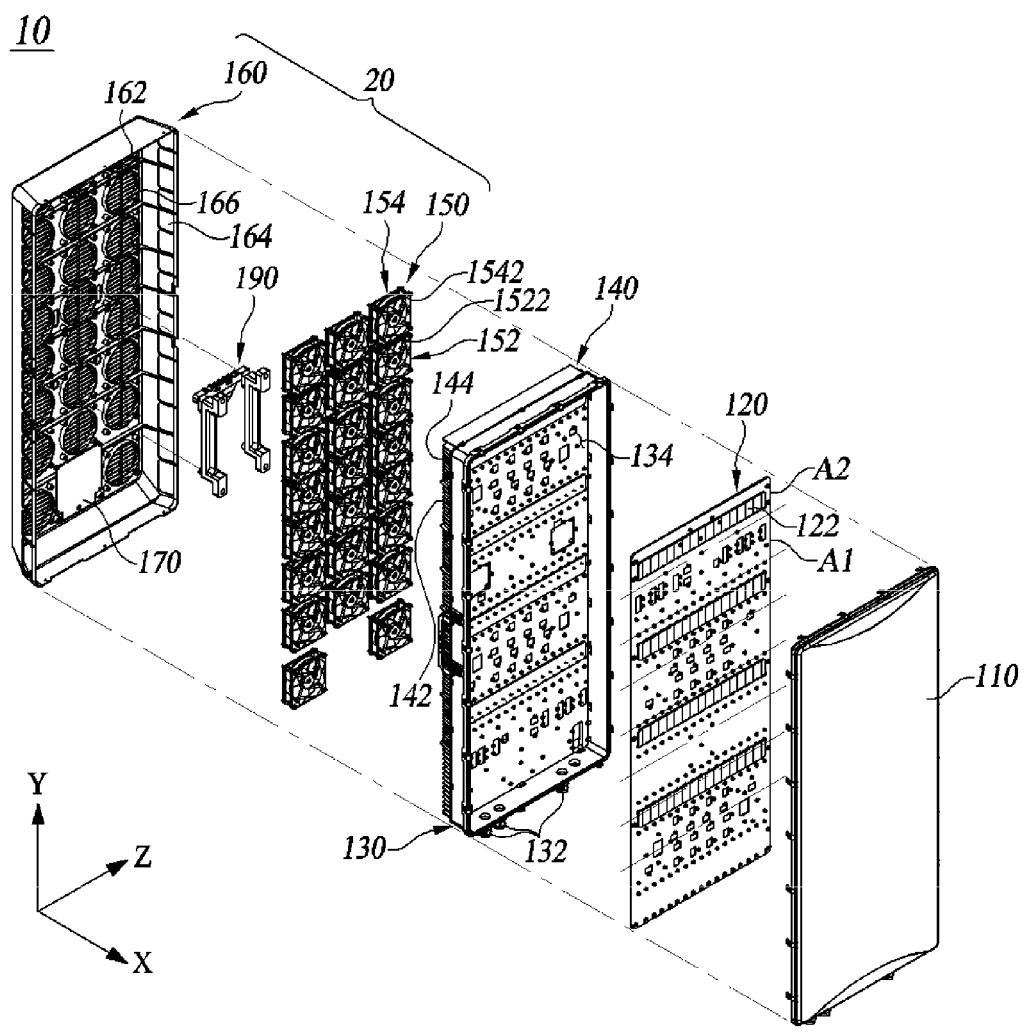
FIG. 3 is an exploded perspective view of the massive MIMO antenna apparatus according to at least one embodiment of the present disclosure.

FIG. 3 is an exploded perspective view of the massive MIMO antenna apparatus 10 according to at least one embodiment of the present disclosure.

Figure 4:
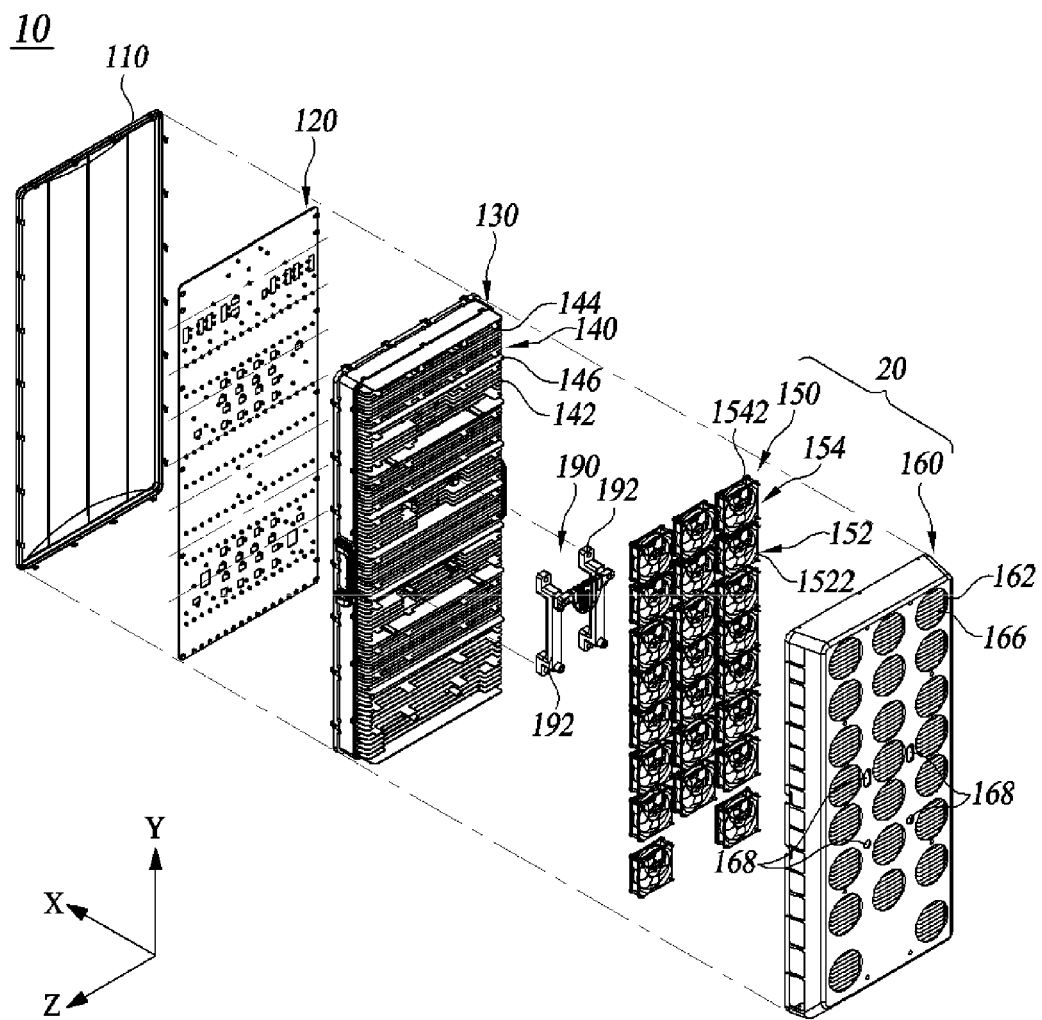
FIG. 4 is an exploded rear perspective view of the massive MIMO antenna apparatus according to at least one embodiment of the present disclosure.

FIG. 4 is an exploded rear perspective view of the massive MIMO antenna apparatus 10 according to at least one embodiment of the present disclosure.

As shown in FIGS. 1 to 4, the massive MIMO antenna apparatus 10 may include a radome panel 110, a substrate or board 120, a housing 130, cooling fins 140, a blowing unit 150, and a back cover 16.

The radome panel 110 may be disposed to face one surface of the housing 130. In particular, the radome panel 110 may be disposed to face one surface of the board 120 accommodated in the housing 130.

The housing 130 may be disposed between the radome panel 110 and the cooling fins 140.

The housing 130 may accommodate the board 120 therein. In particular, the housing 130 may accommodate the board 120 such that the other surface of the board 120 and the one surface of the housing 130 face each other.

Formed on one side of the housing 130, for example, the lower surface of the housing 130 may be a plurality of ports 132 for signal input and output or power supply.

The board 120 may include a plurality of heat-generating components 122 distributed on at least one surface of the board 120. Additionally, the board 120 may have a width and a length greater than the width. Here, the width of the board 120 refers to a dimensional element parallel to the x-axis based on FIG. 3, and the length of the board 120 refers to a dimensional element parallel to the y-axis based on FIG. 3.

Meanwhile, the plurality of heat-generating components 122 disposed on the one surface of the board 120 may include a radio frequency (RF) component for antenna operation and other circuit components for driving the RF component.

The board 120 according to at least one embodiment of the present disclosure includes sections partitioned along the length direction of the board 120, which are a first section A1 having a first amount of heat generation and a second section A2 having a second amount of heat generation greater than the first heat generation amount. Here, the first heat generation amount and the second heat generation amount refer to the total amounts of heat generated in the respective sections. diagonal shape diagonal shape The massive MIMO antenna apparatus 10 according to at least one embodiment of the present disclosure features that the board 120 has a rectangular shape with the length being longer than the width and that the plurality of heat-generating components 122 are disposed on the board 120 along the length direction thereof. Details in this regard will be described with reference to FIG. 5.

Referring back to FIGS. 1 to 4, the cooling fins 140 may be disposed on the other surface of the housing 130.

The cooling fins 140 may be disposed on the other surface of the housing 130 and arranged along the length direction of the board 120. Additionally, each of the cooling fins may extend along the width direction of the board 120.

In the massive MIMO antenna apparatus 10 according to at least one embodiment of the present disclosure, the cooling fins 140 extend along the width direction of the board 120 for allowing the air discharged from the fans of the blowing unit 150 and chilling the cooling fins 140 to subsequently take a shortened path up to departing the cooling fins 140. This can minimize the overall cooling efficiency degradation by saving the air discharged from the fans from running a long path, by preventing the already warmed air from cooling different areas in vain.

However, the present disclosure is not limited thereto, and the cooling fins 140 may each be configured to have a diagonal shape or a 'V' shape. In this case, the present disclosure can use the property of high-temperature air to rise, effecting an easier air discharge.

The blowing unit 150 may be disposed on the rear surface of the cooling fins 140 and may include at least one or more fans for cooling each section of the board 120.

The blowing unit may include a plurality of fans for each board section, wherein the plurality of fans may be disposed along the width direction of the board 120. Since each area of the board 120 is configured to be distinguished along the length direction, when a plurality of fans are disposed along the width direction of the board 120, the number of fans can be effectively increased without increasing the size or weight of the antenna.

FIGS. 3 and 4 illustrate that a plurality of fans arranged in a row for each section of the board 120, but the present disclosure is not limited thereto. For example, two or more rows of fans may be disposed for each section of the board 120.

Meanwhile, formed between the radome panel 110 and the one surface of the board 120 may be a receiving space 134 in which a plurality of heat-generating components 122 are disposed. Specifically, the receiving space 134 may be formed between the radome panel 110 and the one surface of the housing 130 facing the other surface of the board 120. Accordingly, the space in which heat is substantially generated may be the receiving space 134 formed between the radome panel 110 and the housing 130. The heat generated in the receiving space 134 may be transferred from one surface of the housing 130 to the other surface thereof, for example, toward the cooling fins 140.

The apparatus may be configured to render the air discharged from the first blowing unit 152 and the second blowing unit 154 to exclusively chill the cooling fins 140 that have received heat from the receiving space 134 but hold the air from flowing into the receiving space 134. Therefore, the massive MIMO antenna apparatus 10 according to at least one embodiment of the present disclosure may be configured to spatially isolate the space in which heat is substantially generated, e.g., the receiving space 134 from a place cooled by air discharged from the first blowing unit 152 and the second blowing unit 154, e.g., from the other surface of the housing 130 or the cooling fins 140.

This can simplify the structure of the antenna apparatus and provides a blocking effect against undesirable external substances possibly entering and adversely affecting the durability of the heat-generating components 122 disposed on the board 120.

The back cover 160 may be disposed to face the other surface of the housing 130, and a plurality of fans 1522 and 1542 may be disposed on the back cover 160.

The back cover 160 may cover at least some of the other surface of the housing 130 and the cooling fins 140. This allows the back cover 160 to serve as a finger guard to prevent the user from contacting the heated cooling fins 140, as well as a sun shade to protect the parts of the antenna apparatus from external sunlight. Details of the back cover 160 will be described with reference to FIGS. 7, 13, and 14.

Meanwhile, the board 120, the housing 130, and the heat dissipating fins 140 may be cooled through the blowing unit 150 and the back cover 160 that constitute a heat dissipating device 20. The heat dissipation device 20 equals the massive MIMO antenna apparatus 10 minus some components including the board 120, the housing 130, and the cooling fins 140. The heat dissipation device 20 may be applied to and used with an antenna circuit board having other configurations, other arrangements, or other shapes than the board 120 shown in FIG. 3. Details in this regard will be described with reference to FIGS. 13 and 14.

Figure 5:
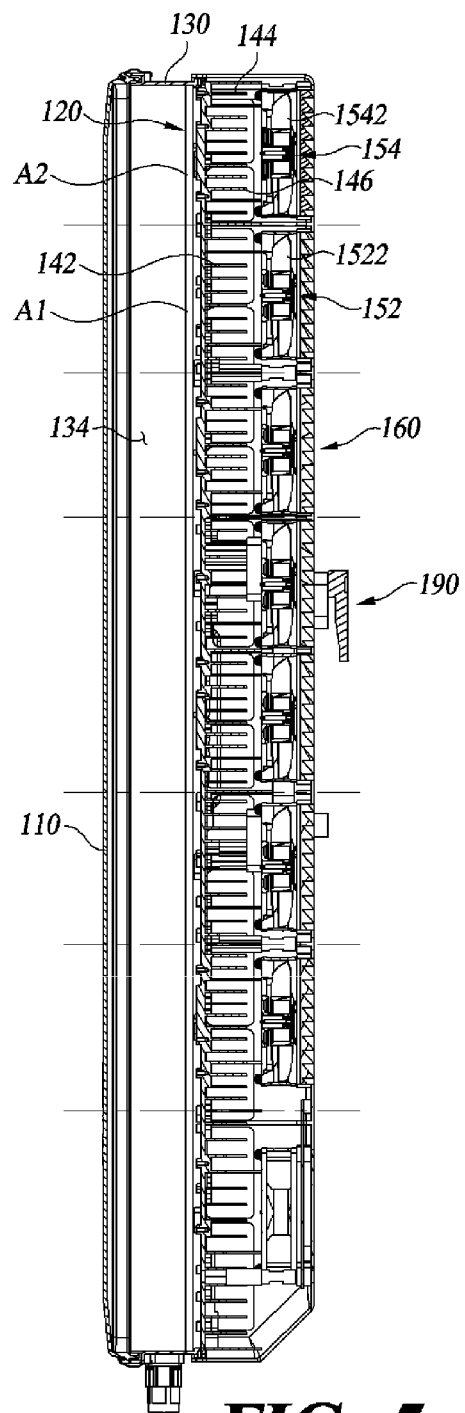
FIG. 5 is a side sectional view of the massive MIMO antenna apparatus according to at least one embodiment of the present disclosure.

FIG. 5 is a side sectional view of the massive MIMO antenna apparatus 10 according to at least one embodiment of the present disclosure.

As shown in FIG. 5, the board 120 according to at least one embodiment of the present disclosure may be partitioned into a plurality of sections along the length direction. Each section of the board may be partitioned based on the amount of heat generated in that section.

For example, the board 120 may include sections partitioned along the length direction of the board 120, which are a first section A1 having a first heat generation amount and a second section A2 having a second heat generation amount greater than the first heat generation amount.

The plurality of cooling fins 140 may include the first cooling fins 142 and second cooling fins 144 overlapping the first section A1 and the second section A2 of the board 120, respectively. Specifically, the first cooling fins 142 may be disposed between the first section A1 and the first blowing unit 152, and the second cooling fins 144 may be disposed between the second section A2 and the second blowing unit 154.

The first cooling fins 142 and the second cooling fins 144 may be configured to take account of the amounts of heat generated in the first section A1 and the second section A2 to provide different intervals between the cooling fins 14 and different vertical heights between the cooling fins 14. Details in this regard will be described with reference to FIGS. 8 to 10.

Referring back to FIG. 5, the blowing unit 150 may include a first blowing unit 152 arranged to overlap at least some of the first board section A1 and a second blowing unit 154 arranged to overlap at least some of the second board section A2.

The first blowing unit 152 may be configured to cool at least some of the heat generated from the first board section A1 and may include at least one or more first fans 1522. Additionally, the second blowing unit 154 may be configured to cool at least some of the heat generated from the second board section A2 and may include at least one or more second fans 1542.

The massive MIMO antenna apparatus 10 according to at least one embodiment of the present disclosure features the board 120 being divided into sections along the length direction of the board 120 according to the amounts of heat generated and the fans being arranged at positions corresponding respectively to the divided sections of the boards 120.

This allows the massive MIMO antenna apparatus 10 according to at least one embodiment of the present disclosure to individually perform temperature control and temperature management for each section of the board 120, which provides an effect of more effectively reducing the relative temperature difference between the respective sections of the board 120.

The more the airflow discharged from the fan, the more the cooling may be achieved. Therefore, since the second section A2 has a second amount of heat release greater than the first amount of heat generation of the first section A1, the airflow discharged from the second blowing unit 154 may be configured to be greater than the airflow discharged from the first blowing unit 152. Details in this regard will be described with reference to FIG. 6.

Additionally, at least one embodiment of the present disclosure features the massive MIMO antenna apparatus 10 that is provided with the board 120 of a rectangular shape having a greater length than the width and is provided with a plurality of heat-generating components 122 arranged on the board 120 along the length direction of the board 120, thereby maximizing the number of fans of the blowing unit 150 that can be disposed on the rear surface of the board 120.

Additionally, the massive MIMO antenna apparatus 10 according to at least one embodiment of the present disclosure arranges a plurality of fans at positions corresponding respectively to the sections of the board 120, thereby providing an effect of performing redundancy control for each section of the board 120. Details in this regard will be described with reference to FIGS. 11 and 12.

Additionally, the massive MIMO antenna apparatus 10 according to at least one embodiment of the present disclosure arranges a plurality of fans at positions corresponding respectively to the sections of the board 120, thereby allowing the rotational speed of each fan to be set at a value slightly lower than the maximum rotational speed of the fan. Lowering the rotational speed of the fan can reduce noise generated from the fan, resulting in a prolonged lifespan of the fan.

Meanwhile, the first section A1 has a first unit heat generation obtained by dividing the first amount of heat generation by an area of the first section A1, and the second section A2 has a second unit heat generation obtained by dividing the second amount of heat generation by an area of the second section A2, wherein the second unit heat generation is greater than the first unit heat generation. This means that the second section A2 emits more heat per unit area than the first section A1.

This can be interpreted that, when assuming that the first section A1 and the second section A2 have substantially the same area, a greater number of heat-generating components are arranged in the second section A2 than in the first section A1. Or, the greater second unit heat generation may tell that multiple components generating relatively greater heat are disposed in the second section A2 compared to those in the first section A1.

Additionally, the first section A1 may include a first heat-generating component group having a first average heat generation, and the second section A2 may include a second heat-generating component group having a second average heat generation greater than the first average heat generation. Here, the average heat generation of each section refers to a value obtained by dividing the total heat generation amount of each section by the number of heat-generating components 122 disposed in that section. Therefore, a high average heat generation in a certain section means that each of the components arranged in that section has a mostly large heat generation amount.

Specifically, disposed in the second section A2 having a large average heat generation may be an RF component that generates a relatively large amount of heat, such as an amplifier of a TX/RX component. Whereas, disposed in the first section A1 may be an RF component that generates relatively little heat, such as a field programmable gate array (FPGA). However, the present disclosure is not limited thereto, and RF components other than the above-described components may be disposed in the first section A1 and the second section A2 of the board 120.

For example, FIG. 5 illustrates the second section A2 as the section of the board 120 with the TX/RX components arranged having a relatively large heat generation amount, and illustrates the first section A1 as the section of the board 120 with the RF components arranged to have a relatively small heat generation amount. However, some embodiments of the present disclosure may differentiate the first section A1 and the second section A2 from among the board sections that commonly have the TX/RX components arranged thereon in the board 120.

For example, assuming that the board 120 has eight sections and that TX/RX components are disposed in the 1st, 3rd, 5th, and 7th sections therefrom as shown in FIG. 5, the present disclosure may name the 1st section with the TX/RX components as the first section A1 of the board 120 and name the 3rd section with the TX/RX components as the second section A2 of the board 120.

With the Massive MIMO antenna apparatus 10, beamforming is performed by adjusting the phase or amplitude of signals transmitted and received by a plurality of TX/RX components. The phase and amplitude of signals transmitted and received by the TX/RX components are dependent on temperature. Accordingly, performing the beamforming needs to be preceded by a process of calibrating the temperature-dependent phase and amplitude variation of the signals in the respective TX/RX components.

Therefore, the more the relative temperature difference between the TX/RX components, the greater the computation load in the component performing the calibration, i.e., in the FPGA, which will then emit a large amount of heat, resulting in an increased heat generation over the entire antenna apparatus. In this respect, reducing the relative temperature between the TX/RX components disposed in each section of the board 120 can be seen as a critical technical challenge in the function of the antenna apparatus as well as in the heat dissipation structure of the antenna apparatus.

Assuming that both the first section A1 and the second section A2 have TX/RX components arranged thereon, the massive MIMO antenna apparatus 10 according to at least one embodiment of the present disclosure may perform cooling on the first section A1 and the second section A2 individually depending on their heat generation amount and thereby reduce the relative temperature difference between the first section A1 and the second section A2 to within a predetermined value. This provides the effect of improving the function of the antenna apparatus as well as improving the heat dissipation efficiency of the antenna apparatus.

Meanwhile, in FIG. 5, the board 120 is illustrated as being divided into eight sections along the length direction, but the present disclosure is not limited thereto. Accordingly, the board 120 according to the present disclosure may be partitioned into other numbers than eight, depending on conditions such as the number of fans, arrangement of RF components, size of the antenna apparatus, and the like.

Although FIG. 5 illustrates that the first section A1 of the board 120 is the second of the eight sections, and the second section A2 of the board 120 is the first of the eight sections, the present disclosure is not limited thereto.

For example, in the present specification, the first section A1 and the second section A2 are meant to differentiate the relative position in the board 120 according to the amount of heat generated, and the first section A1 and the second section A2 are not limited to the positions shown in FIG. 5. Therefore, if the second section A2 has a larger heat generation amount than the first section A1, the first section A1 and the second section A2 may refer to positions different from those shown in FIG. 5.

Additionally, in FIG. 5, the first section A1 and the second section A2 are illustrated as being disposed adjacent to each other, but the present disclosure is not limited thereto. Therefore, the first section A1 and the second section A2 may not be adjacent to each other and may be spaced apart from each other.

Figure 6A:
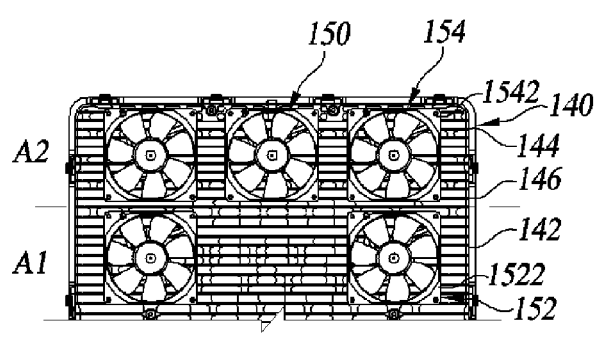
FIGS. 6A, 6B and 6C are views illustrating methods of adjusting an airflow by a first blowing unit and a second blowing unit according to at least one embodiment of the present disclosure.
Figure 6B:
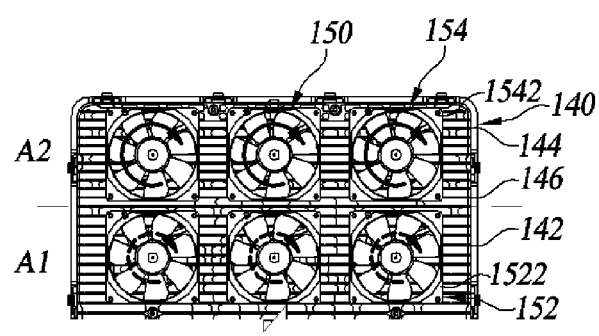
Figure 6C:
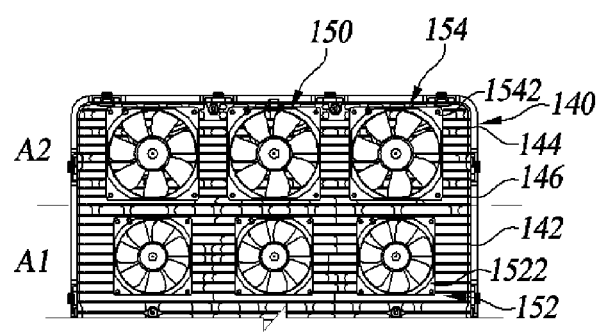

FIG. 6 is a view illustrating methods of adjusting an airflow by the first blowing unit 152 and the second blowing unit 154 according to at least one embodiment of the present disclosure.

In particular, FIG. 6 shows at (a) a method of adjusting the airflow through the number of fans. FIG. 6 shows at (b) a method of adjusting the airflow through the rotational speed of fans. FIG. 6 shows at (c) a method of adjusting the airflow through the size of fans.

As shown in FIG. 6(*a*), to make the airflow discharged from the second blowing unit 154 greater than the airflow discharged from the first blowing unit 152, the number of the second fans 1542 of the second blowing unit 154 may be configured to have a greater number of the second fans 1542 than the first fans 1522 of the first blower 152. To efficiently cool each section of the board 120, a greater number of fans may be disposed in the second section A2 with a large amount of heat generation than in the first section A1 with a small amount of heat generation.

For example, two fans may be disposed in the first section A1 and three fans may be disposed in the second section A2. Assuming that the specifications of the first fan 1522 and the second fan 1542 are the same, the more the fans incorporated, the greater the airflow may come out of the blowing unit 150.

As shown in FIG. 6(*b*), to make the airflow discharged from the second blowing unit 154 greater than the airflow discharged from the first blowing unit 152, the second fan 1542 of the second blowing unit 154 may be configured to have a rotational speed higher than that of the first fan 1522 of the first blowing unit 152.

Assuming that all other specifications of the fan and the number of fans are the same except for the rotational speed of the fan, the higher the rotational speed of the fan, the greater the airflow may come out of the fan.

As shown in FIG. 6(*c*), to make the airflow discharged from the second blowing unit 154 greater than the airflow discharged from the first blowing unit 152, the second fan 1542 of the second blowing unit 154 may be configured to have a size larger than that of the first fan 1522 of the first blowing unit 152.

Assuming that all other specifications of the fan and the number of fans are the same except for the fan size, i.e., the blade size of the fan, the larger the size of the fan, the greater the airflow may come out of the fan.

The massive MIMO antenna apparatus 10 according to at least one embodiment of the present disclosure is configured to partition the board 120 into a plurality of sections based on the amount of heat generated, and to provide the blowing unit 150 with increased airflows at its positions corresponding to the sections of the board 120, having a large amount of heat, thereby effectively and advantageously reducing a relative temperature difference between the respective sections of the board 120.

Figure 7:
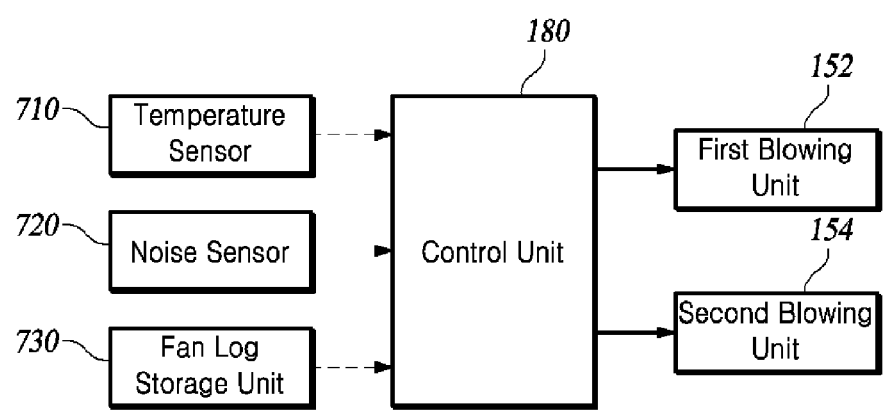
FIG. 7 is a block diagram illustrating the operation of a control unit according to at least one embodiment of the present disclosure.

FIG. 7 is a block diagram illustrating the operation of a control unit 180 according to at least one embodiment of the present disclosure.

As shown in FIG. 7, the massive MIMO antenna apparatus 10 or the heat dissipation device 20 therefor may further include a control unit 180, according to at least one embodiment of the present disclosure.

The control unit 180 may be disposed on a fan circuit board 170, but the present disclosure is not limited thereto. For example, the control unit 180 may be disposed on the board 120 having the heat-generating components 122 thereon.

The control unit 180 may be configured to control the operation of each fan of the plurality of fans. For example, the control unit 180 may control or adjust, based on information on each section of the board 120, switching on/off of each fan, the rotational speed of each fan, the rotational direction of each fan, and the blowing direction of each fan, etc.

For example, the control unit 180 may be configured to adjust the airflow discharged from the first blowing unit 152 and the airflow discharged from the second blowing unit 154 based on the temperature of the first section A1 and the temperature of the second section A2. In this case, the massive MIMO antenna apparatus 10 or the heat dissipation device 20 therefor may further include a temperature sensor 710 for measuring the temperature of each section.

The control unit 180 may be configured to adjust at least one of the rotational speed of the first fan 1522 and the rotational speed of the second fan 1542 based on at least one of the temperature of the first section A1 and the temperature of the second section A2.

For example, when a certain section of the board 120 has a temperature exceeding a predetermined reference temperature value, the rotational speed of a fan corresponding to that section may be increased. Conversely, when a section has a lower temperature than another predetermined reference temperature value, the rotational speed of a fan corresponding to the section may be lowered.

Alternatively, the control unit 180 may be configured to adjust at least one of the number of the first fan(s) 1522 to operate among the one or more first fans 1522 and the number of the second fan(s) 1542 to operate among the one or more second fans 1542, based on at least one of the temperature of the first section A1 and the temperature of the second section A2.

For example, when a certain section of the board 120 has a temperature exceeding a predetermined reference temperature value, the number of operative fans may be increased among a plurality of fans corresponding to that section, and conversely, when a certain section of the board 120 has a lower temperature than another predetermined reference temperature value, the number of operative fans may be reduced among a plurality of fans corresponding to that section.

The control unit 180 may be configured to adjust the airflow discharged from the first blowing unit 152 and the airflow discharged from the second blowing unit 154, thereby maintaining a temperature difference between the first section A1 and the second section A2 within a predetermined range.

Assuming that TX/RX components are disposed in both the first section A1 and the second section A2, the difference between the temperature of the first section A1 and the temperature of the second section A2 may be preferably maintained to have a value or 15 degrees Celsius or less by the control unit 180.

The massive MIMO antenna apparatus 10 or the heat dissipation device 20 therefor may further include a noise sensor 720 configured to measure the volume of noise generated from a plurality of antenna fans.

In this case, the control unit 180 may be configured to adjust, based on the fan noise values measured by the noise sensor 720, at least one of the rotational speed of the plurality of fans and the number of operative fans among the plurality of fans.

For example, when the level of noise generated from a certain fan exceeds a predetermined reference value, the rotational speed of the fan may be lowered or the number of operating fans may be reduced.

Meanwhile, the control unit 180 may further include a first control unit configured to control the operation of the first blowing unit 152 and a second control unit configured to control the operation of the second blowing unit 154. In this case, the first blowing unit 152 and the second blowing unit 154 may be individually controlled by the first control unit and the second control unit corresponding thereto. This can handle a possible failure of some of the first control unit and the second control unit by preventing the stoppage of the entire fans.

Alternatively, the control unit 180 may include a main control unit and a sub-control unit. The main control unit may usually control the operation of the fan, and the sub-control unit may subsidiarily control the operation of the fan when the main control unit fails. This can prevent the stoppage of all of the fans even when the control unit encounters a malfunction.

The massive MIMO antenna apparatus 10 or the heat dissipation device 20 therefor may further include a fan log storage unit 730.

The fan log storage unit 730 may be configured to record information on the number of rotations of each fan among the plurality of fans, and the control unit 180 may be configured to control the operation of each fan based on stored information in the fan log storage unit on the number of rotations of each fan.

For example, the control unit 180 may be configured to be responsive to when the number of rotations of some of the plurality of fans reaches a predetermined value or more for halting the operation of the fan or advising a user or management agent to replace or service the fan.

Meanwhile, the control unit 180 may realize optimized fan driving based on the information obtained in an initial driving state of a plurality of fans.

Specifically, in the initial driving state of the plurality of fans, the control unit 180 varies one or more conditions of the rotational speed of the plurality of fans and the number of operative fans among the plurality of fans and concurrently obtains a plurality of fan driving data items corresponding respectively to the conditions.

Then, after the initial driving state of the plurality of fans, the control unit 180 may apply the optimal one of the plurality of fan driving data items to determine at least one of the rotational speed of the plurality of fans and the number of operative fans among the plurality of fans.

Accordingly, the control unit 180 according to at least one embodiment of the present disclosure may self-learn by obtaining local data such as the operating state of the fans, the installation location of the antenna apparatus, and the installation environment of the antenna apparatus, and derive, based on such learning results, optimized fan operating conditions most suitable for each situation. The massive MIMO antenna apparatus 10 according to at least one embodiment of the present disclosure can perform more efficient heat dissipation by applying these optimized fan operating conditions.

Additionally, assuming the complete incorporation of the control unit 180, temperature sensor 710, noise sensor 720, and fan lock storage unit 730 in the heat dissipation device 20, e.g., at the fan circuit board 170, the heat dissipation device 20 may self-learn without the help of other components, to achieve adaptive fan control.

Figure 8:
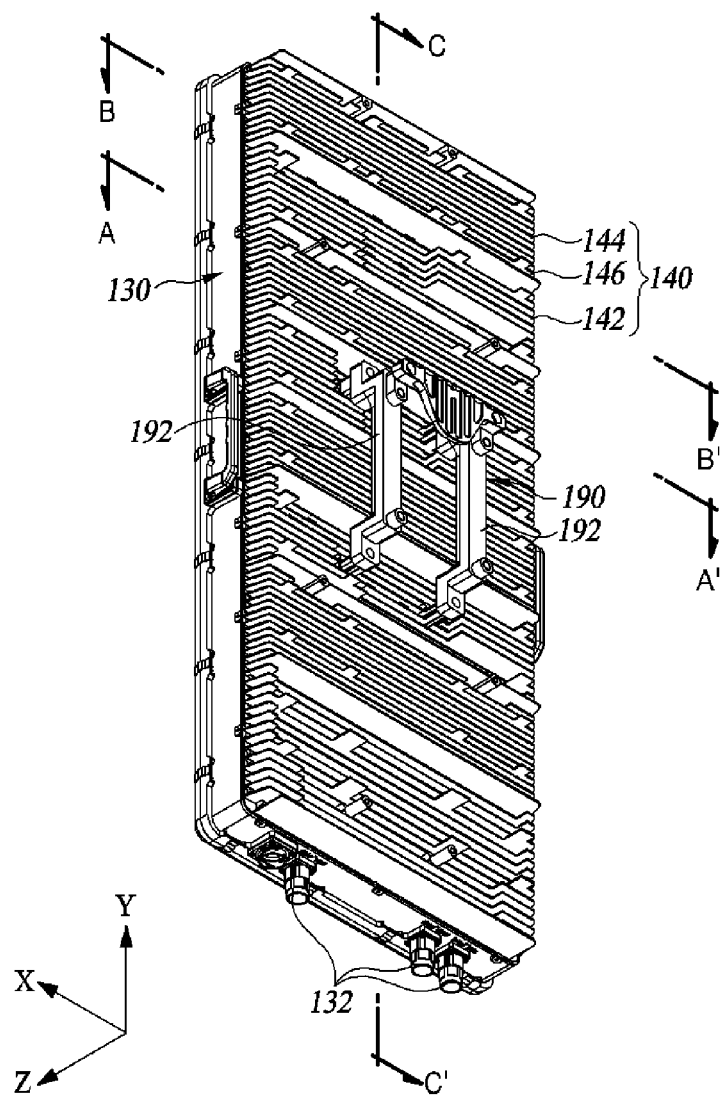
FIG. 8 is a rear perspective view of a housing and cooling fins according to at least one embodiment of the present disclosure.

FIG. 8 is a rear perspective view of the housing 130 and the cooling fins 140 according to at least one embodiment of the present disclosure.

FIG. 9 is cross-sectional views of a first cooling fin 142 and a second cooling fin 144 according to at least one embodiment of the present disclosure. In particular, FIG. 9 illustrates at (a) a cross-sectional view of the first cooling fin 142 taken along the line A-A' of FIG. 8, and FIG. 9 illustrates at (b) a cross-sectional view of the second cooling fin 144 taken along the line B-B' of FIG. 8.

Figure 10:
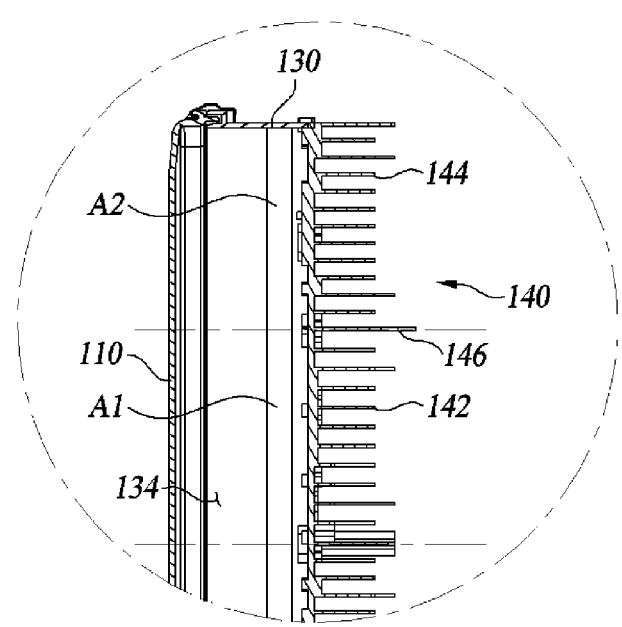
FIG. 10 is a side sectional view of the first cooling fin and the second cooling fin according to at least one embodiment of the present disclosure.

FIG. 10 is a side sectional view of the first cooling fin 142 and the second cooling fin 144 according to at least one embodiment of the present disclosure. In particular, FIG. 10 is a side sectional view of the first cooling fin 142 and the second cooling fin 144 taken along the line C-C' of FIG. 8.

As shown in FIG. 8, a plurality of cooling fins 140 may be disposed on the other surface of the housing 130 along the length direction of the board 120. Additionally, the plurality of cooling fins may each extend along the width direction of the board 120.

In the massive MIMO antenna apparatus 10 according to at least one embodiment of the present disclosure, the cooling fins 140 extend along the width direction of the board 120 to allow the air discharged from the fans of the blowing unit to chill the cooling fins to take shortened paths before departing the cooling fin. This saves the discharged fan air from passing through a long path to prevent the already warmed air from hardly cooling other areas again, thereby minimizing the trouble of overall reduction in cooling efficiency.

Meanwhile, optionally, pulsating heat pipes (PHP) may be installed inside the plurality of cooling fins 140. This can further improve the cooling performance of the cooling fins 140.

Figure 9A:
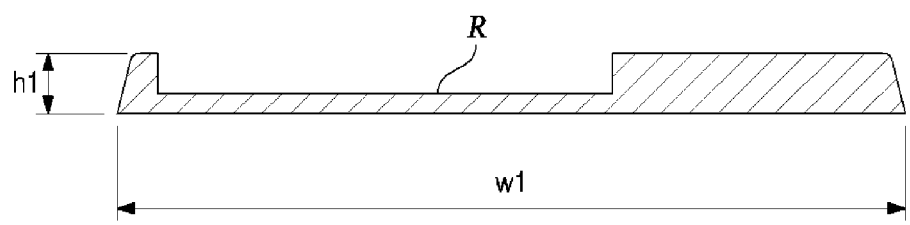
FIGS. 9A and 9B are cross-sectional views of a first cooling fin and a second cooling fin according to at least one embodiment of the present disclosure.
Figure 9B:
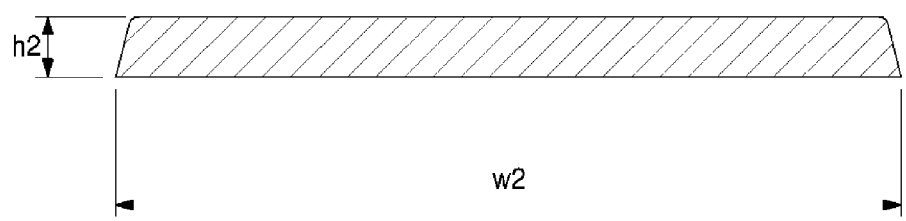

As shown in FIGS. 9(a) and 9(b), the first cooling fin 142 may have a first average vertical height obtained by dividing the cross-sectional area of the first cooling fin 142 by the width of the first cooling fin 142. The second cooling fins 144 may have a second average vertical height obtained by dividing the cross-sectional area of the second cooling fin 144 by the width of the second cooling fin 144. In this case, the second average vertical height may have a greater value than the first average vertical height.

For example, in the cross section, the first cooling fin 142 may have the maximum vertical height of a value h1 and the width of a value w1. Additionally, in the cross section, the second cooling fin 144 may have the maximum vertical height of a value h2 and the width of a value w2. In this case, h1 may be equal to h2, and w1 may be equal to w2.

However, the first cooling fin 142 may include a recess R which makes the area of the first cooling fin 142 smaller than that of the second cooling fin 144. Therefore, the first average vertical height, which is a value obtained by dividing the area of the first cooling fin 142 by the width w1 of the first cooling fin 142, may be smaller than the value of the second average vertical height, which is a value obtained by dividing the area of the second cooling fin 144 by the width w2 of the second cooling fin 144. In this case, at least some of the first cooling fins 142, e.g., the recess, may have a vertical height smaller than the first average vertical height.

The massive MIMO antenna apparatus 10 according to at least one embodiment of the present disclosure is configured such that the average vertical height of the second cooling fin 144 is greater than that of the first cooling fin 142, thereby allowing the second cooling fin 144 to be relatively large compared to the area of the first cooling fin 142. This in effect widens the entire area of the second cooling fin 144 on which heat exchange is performed.

In the massive MIMO antenna apparatus 10 according to at least one embodiment of the present disclosure, the second cooling fins 144 having a relatively large cross-sectional area are disposed in a section corresponding to the second section A2 with a large amount of heat generation, whereas the first cooling fins 142 having a relatively small cross-sectional area are disposed in a section corresponding to the first section A1 with a small amount of heat generation, thereby reducing the weight of the entire cooling fins 140 and maximizing the heat dissipation effect of the cooling fins 140 at the same time.

Meanwhile, FIG. 9 illustrates that the first cooling fin 142 includes a recess and the second cooling fin 144 has a flat shape, but the present disclosure is not limited thereto. With the second average vertical height being greater than the first average vertical height, the first cooling fin 142 and the second cooling fin 144 may have cross-sections different from those shown in FIG. 9.

As shown in FIG. 10, among the plurality of second cooling fins 144, the second cooling fins 144 adjacent to each other may have an interval B2 therebetween which is narrower than an interval B1 between two adjacent first cooling fins 142. For example, the plurality of second cooling fins 144 may be more densely arranged than the plurality of first cooling fins 142.

This allows the total area of the plurality of second cooling fins 144 to have a relatively large value compared to the total area of the plurality of first cooling fins 142, which can increase the total area of the second cooling fins 144 on which heat exchange takes place.

The massive MIMO antenna apparatus 10 according to at least one embodiment of the present disclosure densely arranges the second cooling fins 144 corresponding to the second section A2 with a large amount of heat generation, and sparsely arranges the first cooling fins 142 corresponding to the first section A1 with a small amount of heat generation, thereby reducing the weight of the entire cooling fins 140 and maximizing the heat dissipation effect of the cooling fins 140 at the same time.

Additionally, the plurality of first cooling fins 142 may have a fin thickness different from that of the plurality of second cooling fins 144. The fin thickness of the first cooling fins 142 and the fin thickness of the second cooling fins 144 may be set differently in consideration of the amounts of heat generated in the first section A1 and the second section A2.

For example, in the second section A2, the thickness of the second cooling fins 144 may be configured to be thinner than the first cooling fins 142 such that a greater number of second cooling fins 144 can be arranged to increase the heat exchange area.

Referring back to FIGS. 8 and 10, while cooling the first section A1, the air discharged from the first blowing unit 152 may be arranged to not cross the air discharged from the second blowing unit 154. While cooling the second section A2, the air discharged from the second blowing unit 154 may be arranged to not cross the air discharged from the first blowing unit 152.

Here, 'while cooling the first section A1/second section A2' refers to the duration from when the air discharged from each blowing unit reaches or collides the cooling fins 140 corresponding to each area of the board 120 to substantially begin cooling to the point at which the air is discharged from the cooling fins 140 after chilling the same.

In the massive MIMO antenna apparatus 10 according to at least one embodiment of the present disclosure, the air discharged from each fan may only flow in such section of the cooling fins 140 that corresponds to the fan, but not drift about other sections of the cooling fins 140.

To this end, the massive MIMO antenna apparatus 10 may further include at least one or more partition walls 146 disposed between the plurality of first cooling fins 142 and the plurality of second cooling fins 144.

The vertical height of the partition wall 146 may be greater than the vertical height of the plurality of first cooling fins 142 and second cooling fins 144.

The partition wall 146 may partition the cooling fins 140 into sections corresponding respectively to the sections of the board 120 and may serve to isolate and block the discharged air of the fan corresponding to the section of each of the cooling fins 140 from crossing other sections of the cooling fins 140.

In the massive MIMO antenna apparatus 10 according to at least one embodiment of the present disclosure, each fan corresponding to each section of the board 120 cools only its corresponding section of the cooling fins 140, allowing to predict the relatively accurate flow path of the air discharged from the fan, and further facilitating the control of each fan by the control unit 180.

However, the present disclosure is not limited to the above configuration, and at least some of the air discharged from each fan may be configured to flow into another section of the cooling fins 140. For example, by removing the center area of the plurality of cooling fins 140 or making the height of the center area lower than other areas, the air discharged from the fans may be guided through the center area to flow into other sections of the cooling fins 140.

In this case, when a failure occurs in a fan corresponding to a certain section of the cooling fins 140, that section may still be cooled by an inflow of the air discharged from the fans corresponding to other sections of the cooling fins 140, neighboring the troubled section of the cooling fins 140.

On the other hand, the massive MIMO antenna apparatus 10 further includes, on the other surface of the housing 130, a plurality of protrusions (not shown) disposed between the plurality of cooling fins 140 or in areas facing the fans.

The plurality of protrusions may increase the total area where the heat exchange takes place, and generate turbulence in the air flowing between the cooling fins 140, thereby improving heat transfer efficiency by convection.

Figure 11A:
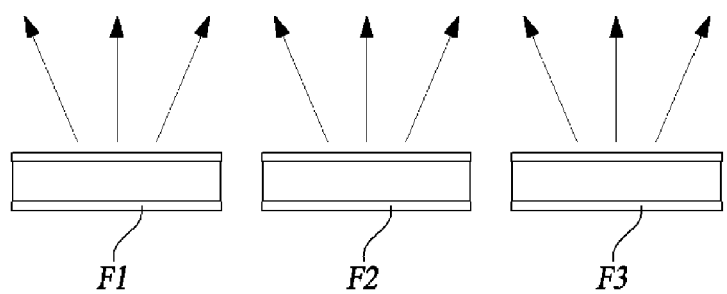
FIGS. 11A, 11B, 12A and 12B illustrate a control unit performing redundancy control according to at least one embodiment of the present disclosure.
Figure 11B:
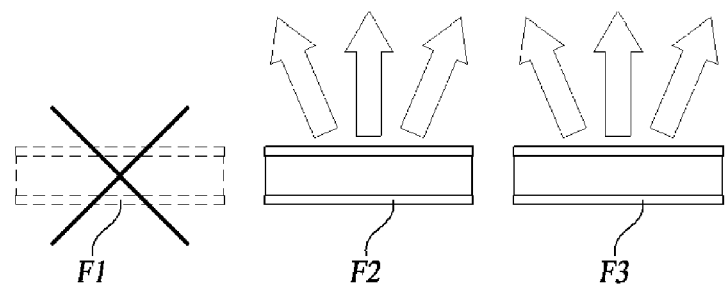
Figure 12A:
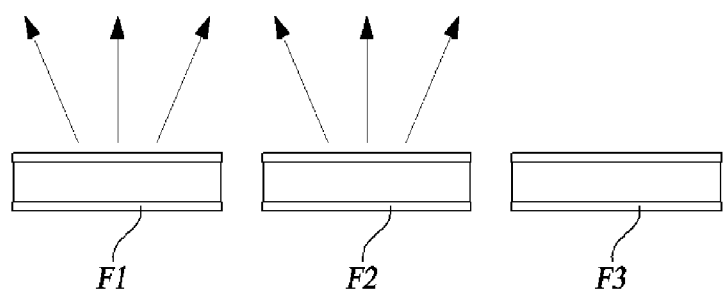

FIGS. 11 and 12 illustrate the control unit 180 performing redundancy control according to at least one embodiment of the present disclosure.

In particular, FIG. 11 illustrates performing redundancy control through rotational speeds of fans, and FIG. 12 illustrates performing redundancy control by changing the number of operative fans.

As shown in FIGS. 11 and 12, the control unit 180 may be configured to perform redundancy control on the first section A1 and the second section A2.

Specifically, as shown in FIG. 11, the control unit 180 may be configured to be responsive to when at least one first fan 1522 stops operating among the plurality of first fans 1522 for increasing the rotational speed of another one or more first fans 1522 in operation.

Additionally, the control unit 180 may be configured to be responsive to when at least one second fan 1542 stops operating among the plurality of second fans 1542 for increasing the rotational speed of another one or more second fan 1542 in operation.

For example, when three fans F1, F2, and F3 are operating as in FIG. 11 at (a), and when one fan F1 fails as shown in FIG. 11 at (b), the control unit 180 may increase the rotational speed of the remaining two fans F2 and F3 that are in normal operation.

Alternatively, as shown in FIG. 12, the control unit 180 may be configured to be responsive to when at least one first fan 1522 stops operating among the plurality of first fans 1522, for additionally operating another one among the plurality of first fans 1522.

Additionally, the control unit 180 may be configured to be responsive to when at least one second fan 1542 stops operating among the plurality of second fans 1542, for additionally operating another one among the plurality of second fans 1542.

Figure 12B:
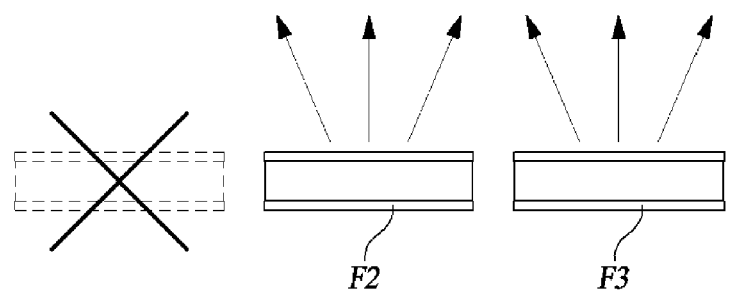

For example, in the case of FIG. 12 (a) assuming three fans F1, F2, and F3 of the board 120 are provided with only two fans F1 and F2 being in operation among the three fans and one fan F3 being in off-state, when one fan F1 has stopped operating between the fans F1 and F2 supposed to operate, the remaining fan F3 may join to operate as shown in FIG. 12(b).

Alternatively, the control unit 180 may be configured to be responsive to at least one first fan 1522 ceased to operate among the plurality of first fans 1522, for changing the blowing directions of other first fans 1522 in operation toward the first fan 1522 ceased to operate, and to be responsive to at least one second fan 1542 ceased to operate among the plurality of second fans 1542, for changing the blowing directions of other second fans 1542 in operation toward the second fan 1542 ceased to operate.

The massive MIMO antenna apparatus 10 according to at least one embodiment of the present disclosure is advantageous in that the board 120 is divided into a plurality of sections along the length direction with a plurality of fans arranged to individually correspond to the respective sections. Therefore, the massive MIMO antenna apparatus 10 according to at least one embodiment of the present disclosure is superior and more advantageous in terms of redundancy control by incorporating multiple fans.

Additionally, the control unit 180 according to at least one embodiment of the present disclosure performs redundancy control on each section of the board 120 and thereby copes with a possible abnormal situation in which some fans become inoperable and maintains a quasinormal operation for providing a uniform airflow.

Figure 13:
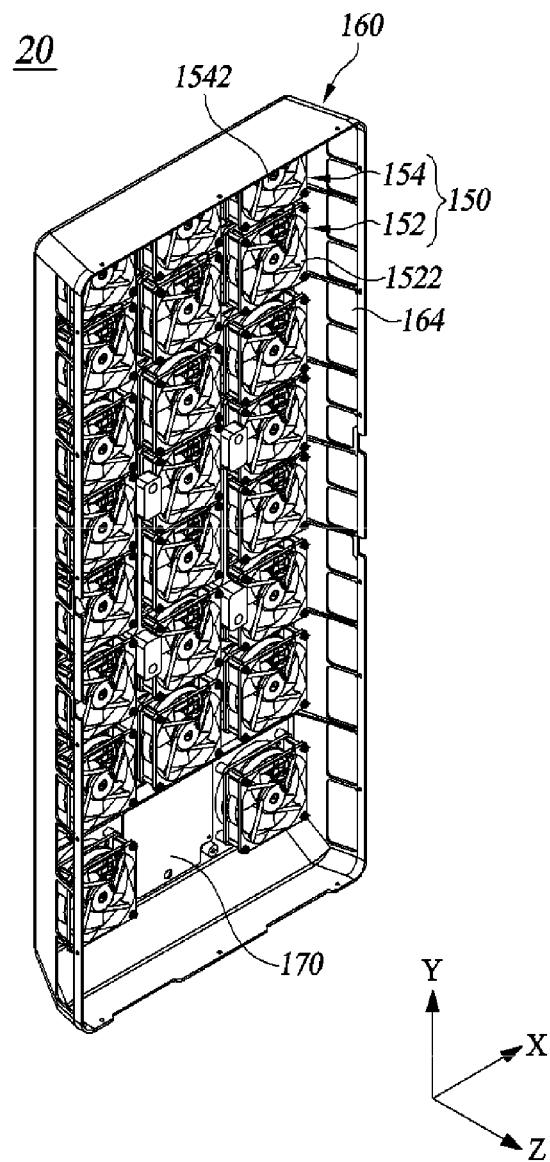
FIG. 13 is a perspective view of a heat dissipation device according to at least one embodiment of the present disclosure.

FIG. 13 is a perspective view of a heat dissipation device 20 according to at least one embodiment of the present disclosure.

Figure 14:
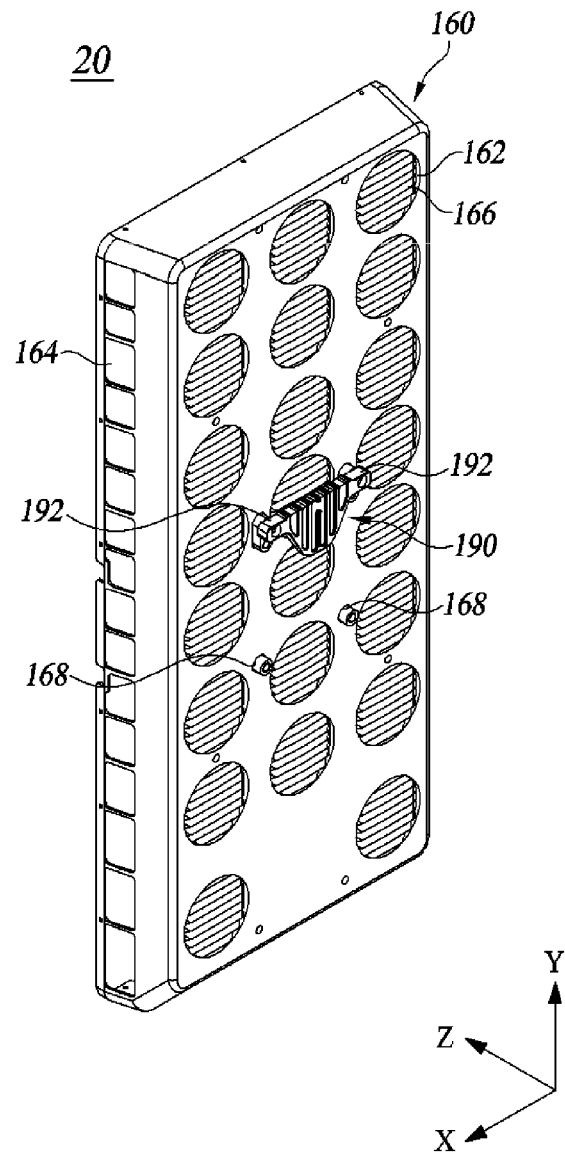
FIG. 14 is a rear perspective view of the heat dissipation device according to at least one embodiment of the present disclosure.

FIG. 14 is a rear perspective view of the heat dissipation device 20 according to at least one embodiment of the present disclosure.

As shown in FIGS. 13 and 14, the heat dissipation device 20 may include a back cover 160 and a plurality of fans.

The back cover 160 may cover at least some of the other surface of the housing 130 and the plurality of cooling fins 140. With this configuration, the back cover 160 may serve as a finger guard to prevent the user from contacting the heated cooling fins 140, as well as a sun shade to protect the parts of the antenna apparatus from external sunlight.

A plurality of fans may be mounted on the back cover 160. Therefore, the massive MIMO antenna apparatus 10 according to at least one embodiment of the present disclosure can have a space-efficient structure by integrating a fan rack feature for mounting a plurality of fans on the antenna apparatus and a finger guard or sun shade feature through the back cover 160.

Additionally, since a plurality of fans is disposed on the back cover 160, the massive MIMO antenna apparatus 10 according to at least one embodiment of the present disclosure can facilitate the maintenance of the plurality of fans.

The back cover 160 may further include a fan circuit board 170 disposed on one side of the back cover 160. In this case, the fan circuit board 170 may be configured to receive power from the board 120 having the plurality of heat-generating components 122 arranged thereon. For example, the fan circuit board 170 may be connected to the board 120 through a power line (not shown) penetrating the housing 130 and to receive power from the board 120.

As described above, the fan circuit board 170 may have the control unit 180, the temperature sensor 710, the noise sensor 720, and the fan log storage unit 730 arranged thereon. In this case, the heat dissipation device 20 may self-learn without the help of other components and thereby perform adaptive fan control.

Although FIGS. 13 and 14 illustrate the fan circuit board 170 as being disposed on the back cover 160, the present disclosure is not limited thereto. For example, the fan circuit board 170 may be integrally formed with the board 120 on which the RF components are disposed, or may be disposed in another area within the housing 130.

Meanwhile, the back cover 160 may further include inlet openings 162, a grille 166, and discharge openings 164.

The inlet openings 162 may be formed on the back cover 160 at positions corresponding respectively to the sections where a plurality of fans are installed. Outside air may be introduced into a plurality of fans through the respective inlet openings 162.

The grille 166 may be disposed over the inlet openings 162 and may prevent undesirable foreign matter from entering the fans.

The discharge openings 164 may be formed on the sides of the back cover 160. Specifically, the discharge openings 164 may be formed in an area on the back cover 160 through which air discharged from the fans is discharged after chilling the cooling fins 140.

Figure 15:
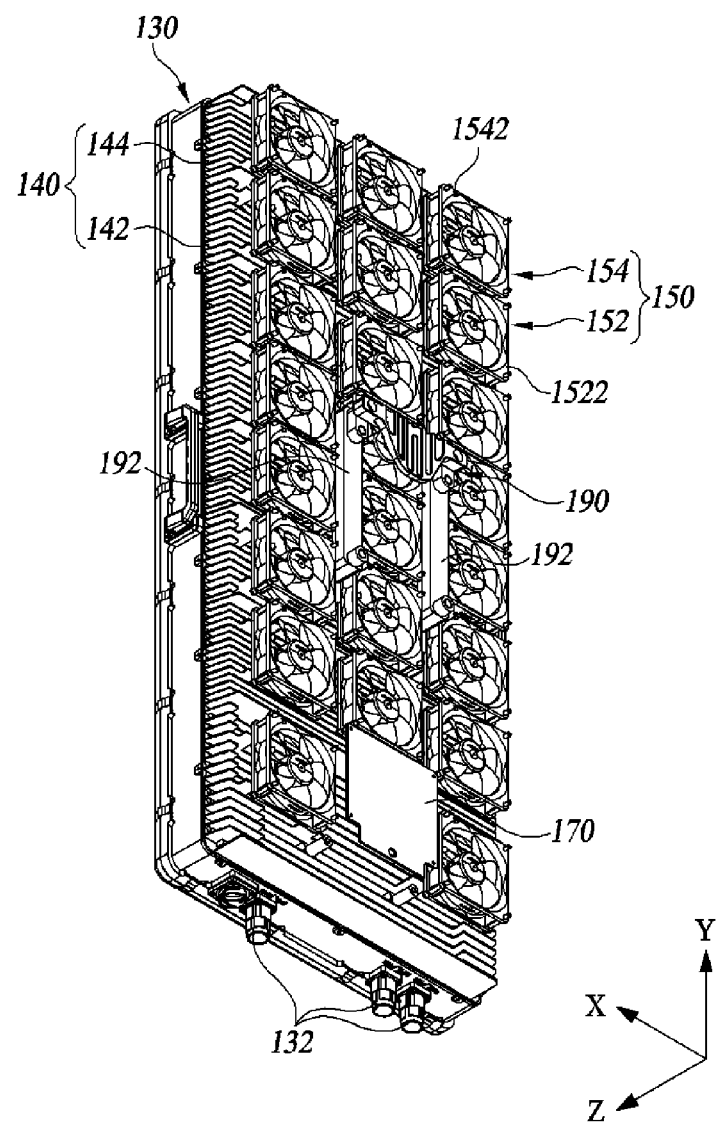
FIG. 15 is a rear perspective view of the massive MIMO antenna apparatus with its back cover removed from FIG. 2.

FIG. 15 shows the massive MIMO antenna apparatus 10 with the back cover 160 removed from FIG. 2.

As shown in FIG. 15, the massive MIMO antenna apparatus 10 may further include a connecting member 190.

The connecting member 190 may fix the massive MIMO antenna apparatus 10 or the heat dissipation device to an external support pole (not shown). The connecting member 190 may include, but is not limited to, a typical bracket or clamping device for fixing the antenna apparatus.

The connecting member 190 may include a plurality of arms 192 configured to be joined to the other surface of the housing 130. With the connecting member 190 fixed to the housing 130 instead of the back cover 160, a load acting on the back cover 160 can be minimized.

The back cover 160 may include one or more through holes 168 (FIG. 4) penetrating the back cover 160, and the plurality of arms 192 may pass the through holes 168. At least one of the plurality of fans may be disposed between two of the plurality of arms 192.

The massive MIMO antenna apparatus 10 according to at least one embodiment of the present disclosure arranges some of the of fans between two arms 192 of the connecting member 190 in a way of minimizing physical interference between the connecting member 190 of the antenna apparatus and the fans while maximizing the number of fans disposed on the back cover 160.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the embodiments of the present disclosure is not limited by the illustrations. Accordingly, one of ordinary skill would understand the scope of the claimed invention is not to be limited by the above explicitly described embodiments but by the claims and equivalents thereof.

The invention claimed is:

1. A massive multiple-input multiple-output (MIMO) antenna apparatus, comprising:
  a board having at least one board surface that holds a distributed arrangement of a plurality of heat-generating components, that has a width and a length, wherein the length is longer than the width, and that includes a first section having a first amount of heat generation and a second section having a second amount of heat generation greater than the first amount of heat generation, the first section and the second section being partitioned along a length direction of the board;
  a first blowing unit disposed to overlap at least some of the first section and configured to cool at least some of heat generated from the first section, the first blowing unit comprising at least one or more first fans; and
  a second blowing unit disposed to overlap at least some of the second section and configured to cool at least some of heat generated from the second section, the second blowing unit comprising at least one or more second fans,
  wherein the second blowing unit is configured to discharge an airflow greater than an airflow that the first blowing unit is configured to discharge,
  wherein the airflow discharged from the first blowing unit is caused to cool the first section while caused to remain unmixed with the airflow discharged from the second blowing unit, and
  wherein the airflow discharged from the second blowing unit is caused to cool the second section while caused to remain unmixed with the airflow discharged from the first blowing unit.

2. The MIMO antenna apparatus of claim 1, wherein the at least one or more second fans of the second blowing unit are greater in number than the at least one or more first fans of the first blowing unit.

3. The MIMO antenna apparatus of claim 2, wherein the second blowing unit comprises the at least one or more second fans that are disposed along a width direction of the board.

4. The MIMO antenna apparatus of claim 1, further comprising:
  a control unit configured to adjust the airflow discharged from the first blowing unit and the airflow discharged from the second blowing unit.

5. The MIMO antenna apparatus of claim 4, wherein the control unit is configured to perform redundancy control for the first section and the second section.

6. The MIMO antenna apparatus of claim 4, configured to adjust at least one of a rotational speed of the first fan and a rotational speed of the second fan based on at least one of a temperature of the first section and a temperature of the second section.

7. The MIMO antenna apparatus of claim 4, wherein the control unit is configured to adjust the airflow discharged from the first blowing unit and the airflow discharged from the second blowing unit to maintain a temperature difference between the first section and the second section within a predetermined range.

8. The MIMO antenna apparatus of claim 7, wherein the temperature difference between the first section and the second section is configured to be maintained within 15 degrees Celsius by the control unit.

9. The MIMO antenna apparatus of claim 1, further comprising:
  a plurality of first cooling fins disposed between the first section and the first blowing unit; and
  a plurality of second cooling fins disposed between the second section and the second blowing unit.

10. The MIMO antenna apparatus of claim 9, wherein the first cooling fins and the second cooling fins extend along a width direction of the board.

11. A massive multiple-input multiple-output (MIMO) antenna apparatus, comprising:

a board having at least one board surface that holds a distributed arrangement of a plurality of heat-generating components, that has a width and a length, wherein the length is longer than the width, and that includes a first section having a first amount of heat generation and a second section having a second amount of heat generation greater than the first amount of heat generation, the first section and the second section being partitioned along a length direction of the board;

a first blowing unit disposed to overlap at least some of the first section and configured to cool at least some of heat generated from the first section, the first blowing unit comprising at least one or more first fans;

a second blowing unit disposed to overlap at least some of the second section and configured to cool at least some of heat generated from the second section, the second blowing unit comprising at least one or more second fans; and a control unit configured to adjust the airflow discharged from the first blowing unit and the airflow discharged from the second blowing unit, wherein the second blowing unit is configured to discharge an airflow greater than the airflow that the first blowing unit is configured to discharge, and wherein the control unit is configured to determine how many of the at least one or more first fans are to operate and how many of the at least one or more second fans are to operate based on at least one of a temperature of the first section and a temperature of the second section.

12. The MIMO antenna apparatus of claim 11, wherein the control unit is configured to adjust the airflow discharged from the first blowing unit and the airflow discharged from the second blowing unit to maintain a temperature difference between the first section and the second section within a predetermined range.

13. The MIMO antenna apparatus of claim 11, further comprising:
a plurality of first cooling fins disposed between the first section and the first blowing unit; and
a plurality of second cooling fins disposed between the second section and the second blowing unit.

14. The MIMO antenna apparatus of claim 13, wherein the first cooling fins and the second cooling fins extend along a width direction of the board.

15. The MIMO antenna apparatus of claim 11, wherein the first section includes a first heat-generating component group having a first average heat generation, and the second section includes a second heat-generating component group having a second average heat generation greater than the first average heat generation.

16. The MIMO antenna apparatus of claim 11, further comprising:
a radome panel having at least a portion disposed to face the at least one board surface on which the plurality of heat-generating components are disposed,
wherein the radome panel and the at least one board surface establish an intervening receiving space, and
wherein the airflow discharged from the first blowing unit and the second blowing unit is caused to not flow into the receiving space.

17. A massive multiple-input multiple-output (MIMO) antenna apparatus, comprising:
a board having at least one board surface that holds a distributed arrangement of a plurality of heat-generating components, that has a width and a length, wherein the length is longer than the width, and that includes a first section having a first amount of heat generation and a second section having a second amount of heat generation greater than the first amount of heat generation, the first section and the second section being partitioned along a length direction of the board;
a first blowing unit disposed to overlap at least some of the first section and configured to cool at least some of heat generated from the first section, the first blowing unit comprising at least one or more first fans; and
a second blowing unit disposed to overlap at least some of the second section and configured to cool at least some of heat generated from the second section, the second blowing unit comprising at least one or more second fans,
wherein the second blowing unit is configured to discharge an airflow greater than an airflow that the first blowing unit is configured to discharge, and
wherein the first section has a first unit heat generation obtained by dividing the first amount of heat generation by an area of the first section, and the second section has a second unit heat generation obtained by dividing the second amount of heat generation by an area of the second section, the second unit heat generation being greater than the first unit heat generation.

18. The MIMO antenna apparatus of claim 1, wherein the first section includes a first heat-generating component group having a first average heat generation, and the second section includes a second heat-generating component group having a second average heat generation greater than the first average heat generation.

19. The MIMO antenna apparatus of claim 1, further comprising:
a radome panel having at least a portion disposed to face the at least one board surface on which the plurality of heat-generating components are disposed,
wherein the radome panel and the at least one board surface establish an intervening receiving space, and
wherein the airflow discharged from the first blowing unit and the second blowing unit is caused to not flow into the receiving space.

20. The MIMO antenna apparatus of claim 17, wherein the first section includes a first heat-generating component group having a first average heat generation, and the second section includes a second heat-generating component group having a second average heat generation greater than the first average heat generation.

* * * * *